US006858958B2

(12) United States Patent (10) Patent No.: US 6,858,958 B2
Schrotter (45) Date of Patent: Feb. 22, 2005

(54) METHOD AND DEVICE FOR TRANSMITTING FORCE MAGNETICALLY

(75) Inventor: Johannes Schrotter, Vaduz (LI)

(73) Assignee: Planet Energy Limited (CH)

(*) Notice: Subject to any disclaimer, the term of this patent is extended or adjusted under 35 U.S.C. 154(b) by 0 days.

(21) Appl. No.: 10/432,020

(22) PCT Filed: Nov. 20, 2001

(86) PCT No.: PCT/IB01/02187

§ 371 (c)(1),
(2), (4) Date: Sep. 15, 2003

(87) PCT Pub. No.: WO02/41477

PCT Pub. Date: May 23, 2002

(65) Prior Publication Data

US 2004/0046468 A1 Mar. 11, 2004

(30) Foreign Application Priority Data

Nov. 20, 2000 (WO) .............................. PCT/CH00/00621

(51) Int. Cl.⁷ .............................................. H02K 49/00
(52) U.S. Cl. ........................................ 310/103; 310/74
(58) Field of Search .......................... 310/103, 74, 83, 310/99; 74/572, 574

(56) References Cited

U.S. PATENT DOCUMENTS 5,013,949 A 5/1991 Mabe 5,590,568 A * 1/1997 Takara ......................... 74/572

* cited by examiner

Primary Examiner—Thanh Lam
(74) Attorney, Agent, or Firm—Nixon & Vanderhye, P.C.

(57) ABSTRACT

The present invention relates to a method and a device for transmitting force, in particular an impetus, by magnetic interaction. Thereby, a plurality of supports are fitted with one or more magnets and rotatably supported by bearing means. Each support is connected to one or more freewheel means, i.e. freewheeling bearings, so that each support can be put into rotation or motion, about an axis of rotation or along a straight or curved path in only one direction. Also, each support is fitted with one or more individual magnets in a predetermined arrangement. A plurality of such supports are arranged at a distance relative to one another in such a way that an impetus transmitted to a first support is transmitted by this first support to an adjacent second support by magnetic interaction, is transmitted by said second support to the third support adjacent said second support, and so on. It is of importance that the freewheel means make it impossible for a support which has been set in motion to go into reverse and this causes virtually the whole of the impetus to be transmitted to whichever is the next support at the time. Hence a starting impetus, having once been transmitted to the magnetic impetus-transmitting device from an external source of impetus, can be transmitted for long distances with virtually no losses in a similar way to a wave. If the distance is a closed loop, e.g. a circle, the impetus can be maintained for quite long periods.

28 Claims, 20 Drawing Sheets

METHOD AND DEVICE FOR TRANSMITTING FORCE MAGNETICALLY

The present application is a 35 U.S.C. § 371 U.S. National Phase of PCT/IBO01/102187, filed 20 Nov. 2001, which designated the U.S.

FIELD OF THE INVENTION

The invention relates to a method and a device for transmitting force magnetically by means of movable magnets which interact with one another.

PRIOR ART

Magnetic devices for transmitting force have long been known in which a drive force is transmitted from a first rotatably mounted body to a second rotatably mounted body. The first and second bodies are co-axially positioned at a distance from one another. The transmission of force produced by the action of magnets is similar to that by meshing gears forming a gear train. One disadvantage of such known force-transmission devices is that as the size of the force to be transmitted rises so too do the transmission losses.

U.S. Pat. No. 5,013,949 (Mabe) discloses magnetic transmissions in on contact torque transmitting relation with both a rotatable sun member and a rotatable ring member. Each of the rotatable members is provided with a plurality of magnetic poles which comprise alternating north and south magnetic polarities. The disclosed transmissions can be used as speed increasing or decreasing transmissions depending on the member which is driving and driven, respectively. Further, the transmission allows the separation of the first rotatable member from the second rotatable member.

DE-A-43 02 216 (Schrötter) discloses a transmission comprising two or more roll-like bodies which are rotatably supported and arranged parallel and in close relationship to each other. In the outer surfaces of the roll-like bodies helix-shaped magnets are provided whereas the magnet poles of the same polarity are directed radially outwardly. Force transmission from one roll to the next one is achieved by the repulsive effects of the poles of the same polarities.

OBJECT OF THE INVENTION

The object of the present invention is to provide an improved method and a device for transmitting force, in particular an impetus, magnetically by means of which the torque-transmitting ability in particular can be improved. Another aim is to provide a method and a device for transmitting force magnetically by means of which impetuses can be transmitted over long distances. It is also an aim to propose a method and device to allow energy to be tapped off.

SUMMARY OF THE INVENTION

In accordance with the invention, the object is achieved by providing a plurality of supports or members to hold or position one or more magnets, by arranging each support to be movable on or by means of bearing means, on for example a spindle, shaft, rail, ring, etc., by connecting each support to one or more freewheel means, i.e. backflush or back-stop means, which ensure that the support can move in only one specific direction, along either a straight or curved path, i.e. is rotatable or movable, as the case may be, in only one direction, by fitting each support with one or more individual magnets, with the magnets being arranged at specific positions and in specific orientations, and by arranging a plurality of said supports at a distance relative to one another in such a way that an impetus transmitted to a first support is transmitted by this first support to an adjacent second support by magnetic interaction, is transmitted by said second support to the third support adjacent said second support, and so on, in which case the freewheel means makes it impossible for a support which has been set in motion to go into reverse and this causes virtually the whole of the impetus to be transmitted to whichever is the next support at the time. In this way an impetus transmitted to the first movable support or member will be transmitted step by step to the last movable support or member in a series of co-operating and magnet bearing supports or members. The advantage which this method has is that a starting impetus, having once been transmitted to the magnetic force-transmitting device from an external source of impetus, can be transmitted for long distances with virtually no losses in a similar way to a wave. Even though the freewheel means can basically be produced in different ways, it is preferable for freewheeling bearings (also known as backflush or back-stop bearings) to be used. In an advantageous embodiment the support may even form part of the bearing means and/or freewheel means.

The invention distinguishes from the prior art discussed above in that the movable members are not only supported by bearings but are also in a co-operating relationship with backflush or back-stop means. These backflush or back-stop means, in particular backflush or back-stop bearings, ensure that the magnet bearing members can move only in one direction. Still further, the members are actuated not simultaneously, but consecutively. This means, that only a few members or supports will be in motion after an impetus has been transmitted to an inventive impetus transmitting device.

Advantageously, the support provided is a carriage and a plurality of carriages are arranged in a line and at a distance from one another on a rail, ring, etc. which follows a straight or curved or circular etc. path, so that a starting impetus transmitted from an external impetus source to the first carriage can be transmitted to the last carriage situated on the rail. Alternatively, the support provided may be a disc or a ring and a plurality of discs or rings may be arranged at a distance from one another on a common axis of rotation to form a stack or a disc or ring assembly, so that a starting impetus transmitted from an external impetus source to the first disc in the stack can be transmitted to the last disc in the stack. Even though the supports can, basically, be lined up to follow one another in different geometrical arrangements, they are preferably arranged in a straight line one behind the other or along a circular path.

The magnets which adjacent supports have and which are used to transmit the impetus from one support to the next are preferably so orientated that when they approach one another a repulsion, which is preferably the maximum, results. What this means is that the like poles of the magnets belonging to adjacent supports are preferably directed towards one another. A variant for which there is a particular preference is obtained if coil formers are arranged at a distance from the path of movement of the magnets so that the movement of the magnets will generate an electrical field in the coils by induction and an electric current can be tapped off. This makes it possible for differently orientated magnets to be arranged on a single support and for some of the magnets to be used for impetus transmission and the others to be used to generate a field by induction. The co-operating magnets may be arranged on the same circular path or may be radially offset from one another. In a non-closed-loop arrangement, e.g. where the supports are arranged in a line, it is preferable for the impetus from the last support to be fed back again to the first support. The advantage this has is that a single impetus can be stored in the support arrangement for quite a long time.

The present invention also relates to a device for at least the magnetic transmission of impetus, having a plurality of supports each fitted with one or more magnets, each support being arranged on or by means of bearing means, e.g. on a spindle, axis, shaft, ring or the like, and one or more freewheel means, in particular freewheeling bearings, being connected to each of the individual supports in such a way that the supports having the magnets are able either to rotate about an axis of rotation or to move along a straight or curved path formed by a rail, shaft, ring, etc., in only one direction, and to an arrangement of the supports relative to one another such that an impetus transmitted to a first support is transmitted by magnetic interaction from this first support to the adjacent second support, from this second support to the third support adjacent to the second support and so on, with the reversal of direction of a support once set in motion which is made impossible by the freewheeling bearing or bearings causing the impetus to be transmitted virtually in full to whichever support is next. The advantage this has is that once a starting impetus has been transmitted to the magnetic force-transmitting device from an external impetus source it can be transmitted for long distances with virtually no losses in a similar way to a wave.

As already described above, a support may take the form of a carriage and a plurality of carriages may be arranged to be spaced apart from one another in a line on a rail so that they can move in only one given direction, meaning that a starting impetus transmitted from an external impetus source to the first carriage will be transmitted through to the last carriage on the rail. Alternatively, the support provided may also be a disc or ring and a plurality of discs or rings may be positioned at a distance from one another on a common axis of rotation to form a disc or ring assembly. The geometries described above are easy to achieve in practice and are found to be particularly beneficial.

A disc acting as a support is advantageously carried by a central freewheeling bearing which ensures that the support is supported by a bearing and can turn in only one direction of rotation. The freewheeling bearing may be a combination of a conventional bearing and a freewheeling bearing. To keep the stress on the freewheeling bearing low, it is useful for the rings, discs, carriages, etc. to rest on suitable separate bearings or to be held by the latter in such a way as to be movable in at least one direction, and for separate freewheeling bearings to be used which, in conjunction with for example a gear which cooperates with suitable teeth on the ring or disc, monitor the direction of travel or movement. It goes without saying that if a plurality of bearings are used they may rest against the inner and/or outer circumference of a ring.

It is conceivable for a disc to be provided as a support for the magnets and for a plurality of such discs to be arranged at a distance from one another in a common plane so as to be rotatable in only one specific direction (axis of rotation perpendicular to the common plane) so that a rotary starting impetus transmitted to the first disc from an external impetus source will be transmitted through to the last disc in the disc assembly. It is possible in this case for the discs to be so arranged as all to turn in the same direction of rotation or for alternate discs to turn in opposite directions when they are situated not one behind the other but next to one another. It is also conceivable for the discs to be arranged as a stack and in a circle (see FIG. 17).

In a particularly preferred embodiment, coils are arranged at a distance from the path along which the magnets move so that moving the magnets causes an electrical field to be generated in the coils by induction and an electrical current can be tapped off. When this is the case and the magnet support used is a ring, the coils may be positioned in the plane of the ring at a distance from its periphery or perpendicularly to the plane of the ring.

Each support is preferably fitted with at least two differently orientated magnets spaced apart from one another, with the magnets in a specific first orientation being used to transmit the impetus to the adjacent support and the magnets in a specific second orientation being used to allow the power to be tapped off. The surprising effect which an arrangement of this kind has is that energy can be tapped off and obtained from an arrangement constructed as detailed above. It is conceivable, where supports co-operating with one another are laid out in a line, for means to be provided to transmit or feed the impetus from the last support back to the first support. Such means may for example be a shaft which connects the last support to the first one.

The bearing means used for the supports may be bearings of any kind such as ball bearings, plain bearings, air bearings or the like. The only thing that is important is that they should allow the supports to be moved or transported with the least possible losses so that not too much of the energy fed in from outside in the form of an impetus is wasted in frictional losses.

BRIEF DESCRIPTION OF THE DRAWINGS

The invention will be described in more detail below by reference to the drawings. In each case the same reference numerals are used for the same parts in the drawings.

In the drawings

DETAIL DESCRIPTION OF THE INVENTION

Figure 1:
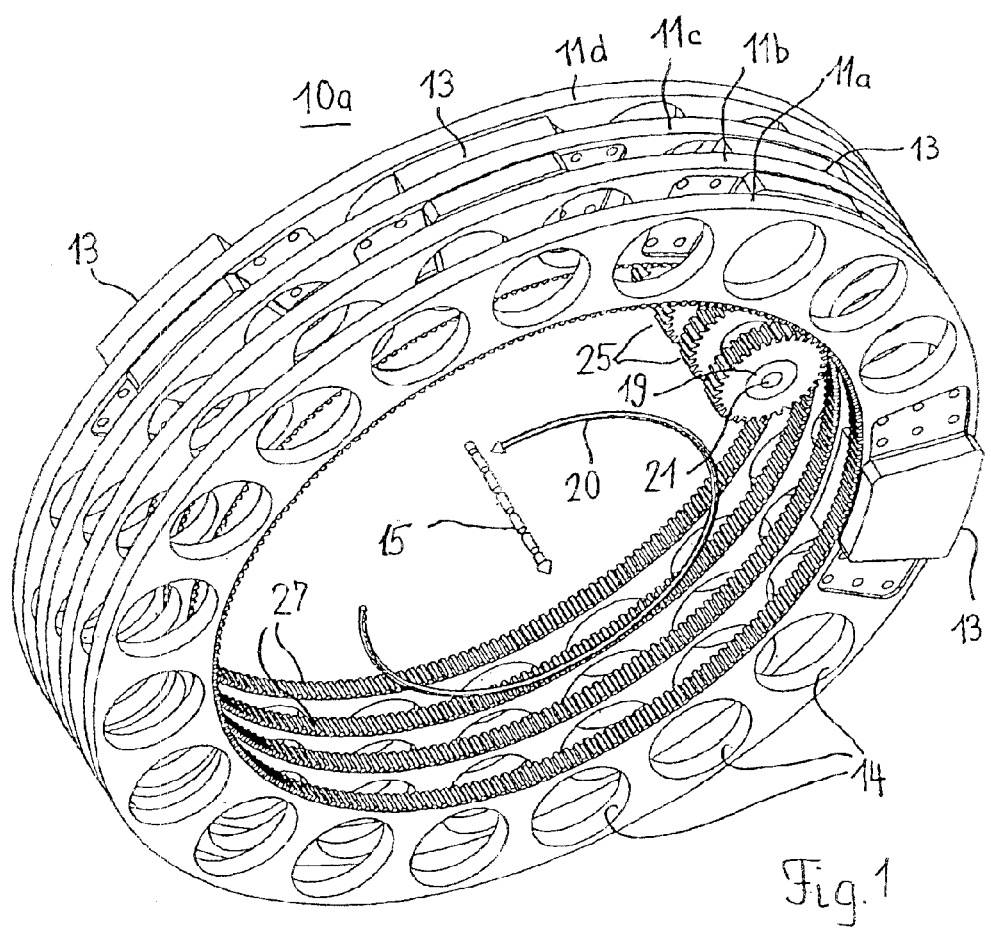
FIG. 1 is a perspective view of a first embodiment of a device for transmitting force magnetically comprising individual, independently rotatable rings.
Figure 2:
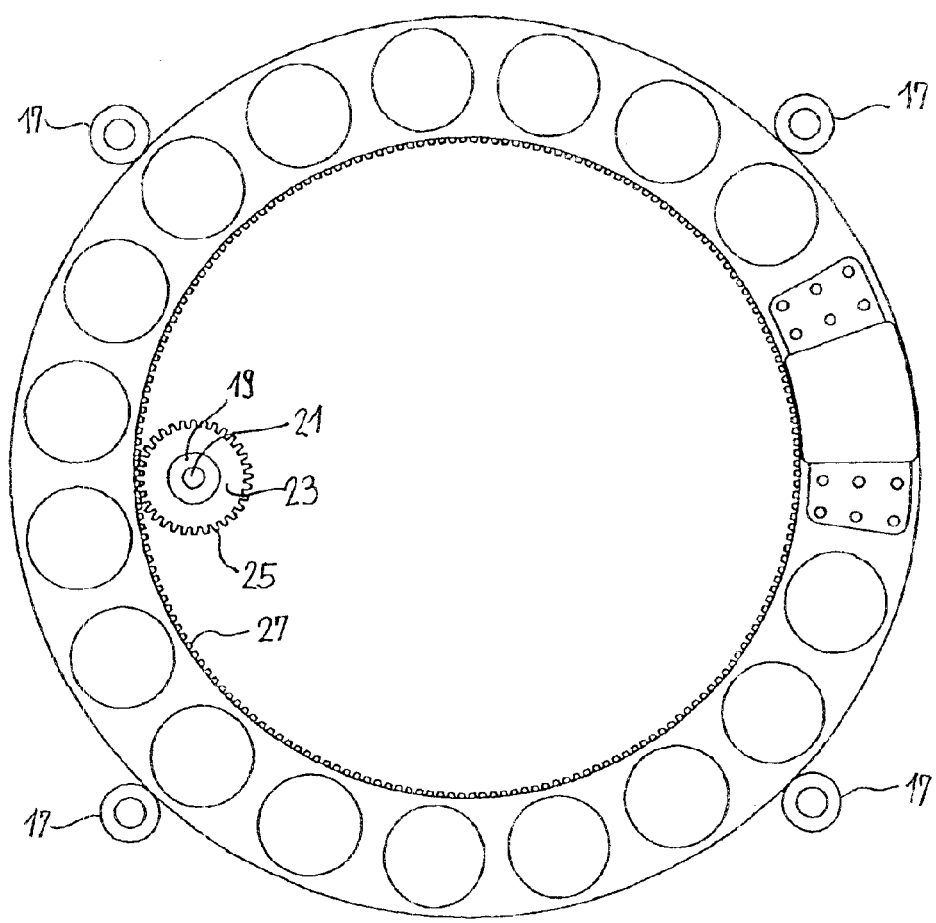
FIG. 2 is a plan view of an individual ring from the device shown in FIG. 1.
Figure 3:
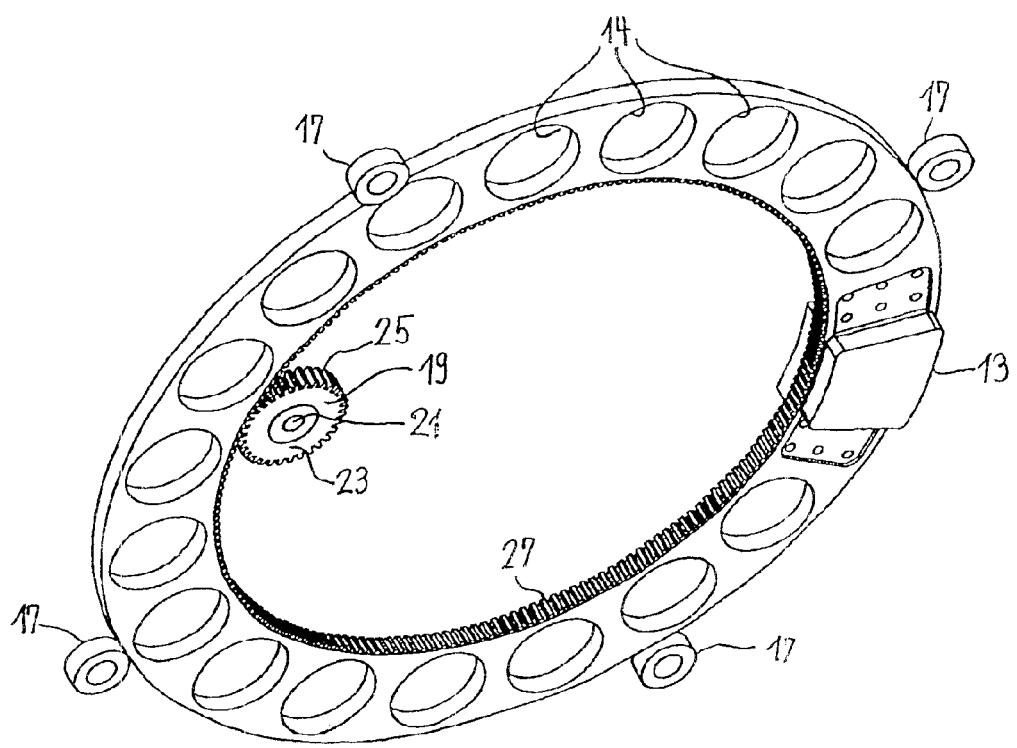
FIG. 3 is a perspective view of the ring shown in FIG. 2.

FIGS. 1 to 4 show a first embodiment of a device 10a according to the invention for transmitting force magnetically which is formed by a plurality of rings 11a, 11b, 11c, etc. which are spaced apart from one another and are fitted for magnets 13. The rings 11a, 11b, 11c etc. act as supports for the magnets 13 and are free to rotate about a common axis 15. Positioned around the peripheries of rings 11a, 11b, 11c, etc. at regular intervals are bearings 17 (not shown in FIG. 1) which ensure that the rings are free to rotate with the absolute minimum of frictional losses.

Each ring 11a, 11b, 11c, etc. is fitted with at least one magnet 13. At least part of the magnet or magnets is held in recesses 14a in ring 11. The magnets 13, which are used to transmit force from ring to ring, are orientated in the same direction on the rings, which are arranged one behind the other, so that poles magnetised in that same way encounter one another when the rings rotate relative to one another. This arrangement for the magnets 13 ensures that a rotary impetus transmitted to ring 11a for example from an external device (not shown) is transmitted to the next ring 11b because of the magnetic repulsion and is then passed on by the latter to ring 11c, and so on to whichever is the adjacent ring in the particular case, in a similar way to a wave being propagated.

To prevent a ring 11 which is set in rotary motion from moving in reverse the rings are each connected to at least one freewheeling bearing 19. The freewheeling bearing 19 ensures that each ring 11a, 11b, 11c, etc. can turn in only one direction (arrow 20=direction of rotation) and cannot reverse its rotation when a magnet of the same polarisation is approached on the adjacent support. In the embodiment shown the freewheeling bearing 19 is mounted on a shaft 21 (not shown in detail) extending co-axially to the axis of rotation 15 and is connected to be locked in rotation to a gear 23. The teeth 25 of gear 23 mesh with a matching set of teeth 27 on the inside of a ring 11a, 11b, 11 c, etc.

Figure 4:
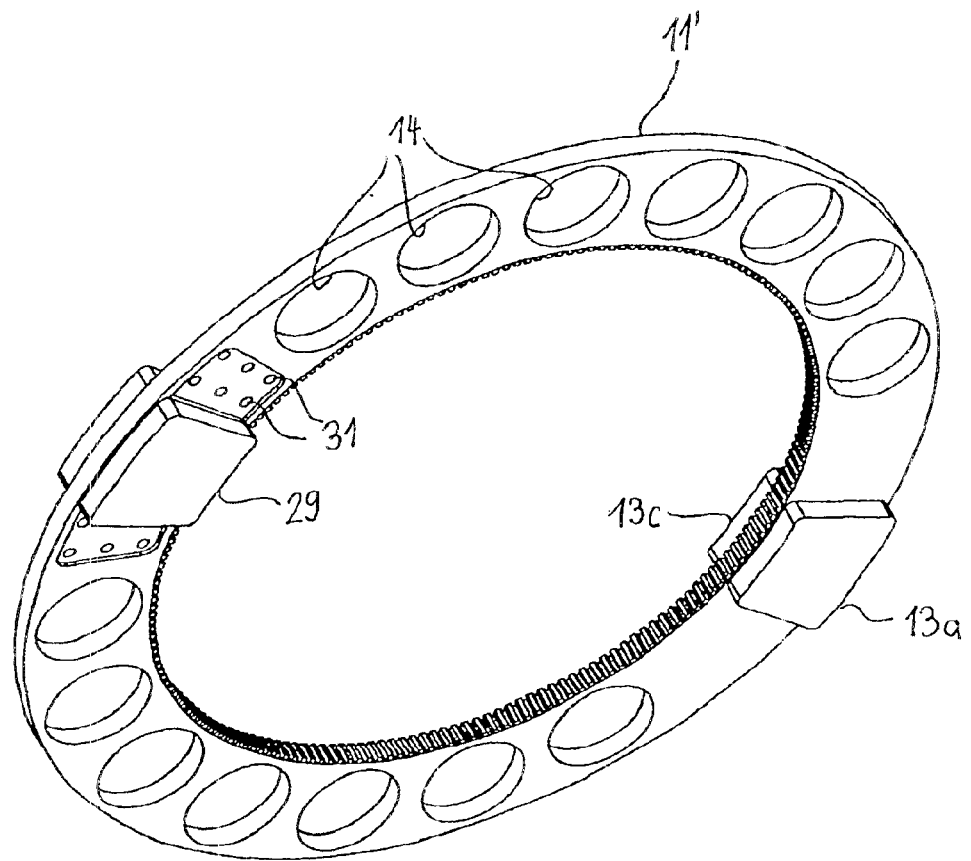
FIG. 4 is a perspective view of a second embodiment of ring having two magnets.
Figure 5:
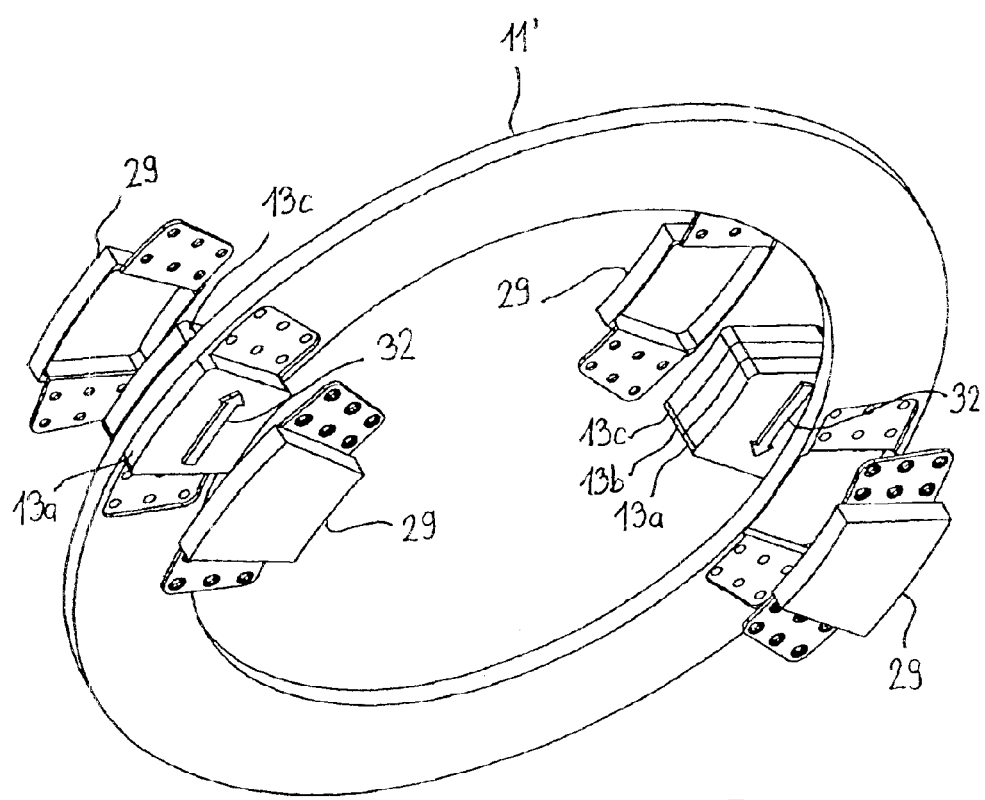
FIG. 5 is an exploded view of the embodiment shown in FIG. 4.

FIGS. 4 and 5 show a second embodiment of ring 11' for use in a force-transmitting device according to the invention. Ring 11 differs from the embodiment shown in FIGS. 1 to 4 chiefly in that two magnets 13 situated diametrically opposite one another are arranged on ring 11. The magnets 13, which are rectangular in plan, are partly held on ring 11 in corresponding recesses and are arranged to be orientated in the same way (arrow 32=direction of polarisation). To make the magnetic field as strong as possible, the magnets 13 are preferably assembled into a stack from a plurality of individual magnets 13a, 13b, 13c (see FIG. 5). Each stack of magnets is held together by cups 29 which are secured to opposite sides of ring 11 by rivets 31. It goes without saying that the stacks of magnets can be fastened in place by any suitable means familiar to the person skilled in the art.

Figure 6:
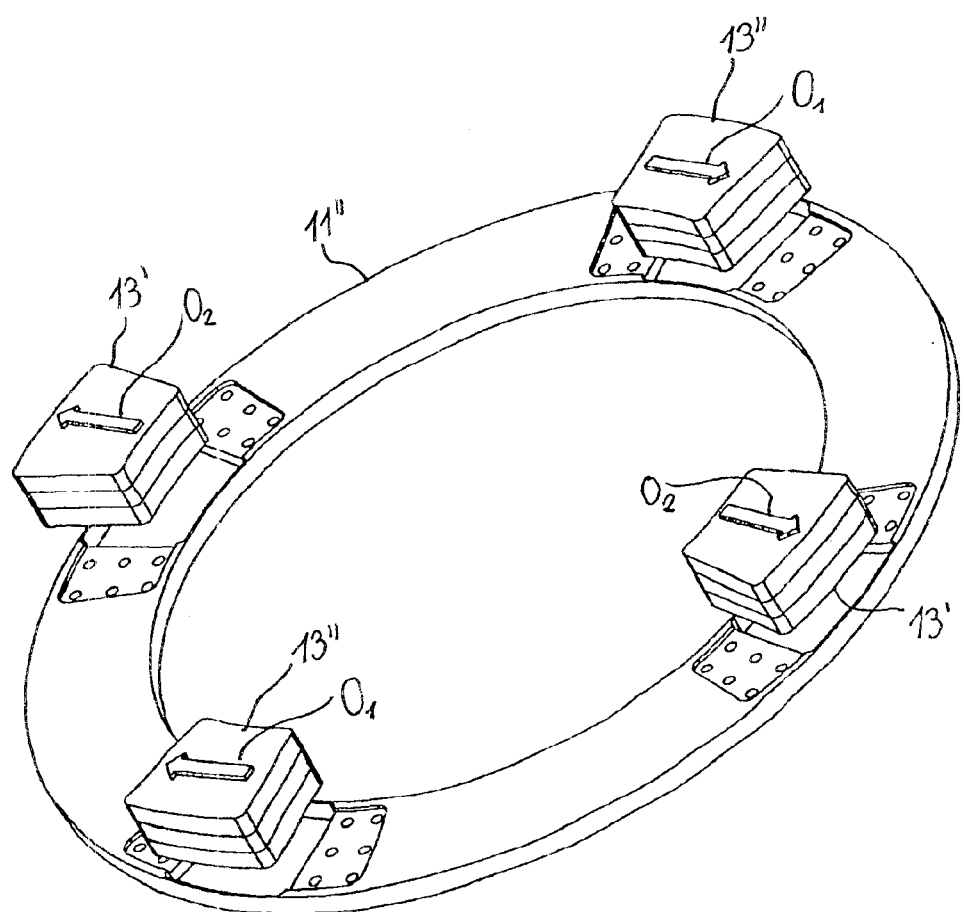
FIG. 6 shows a third type of ring having a total of four cutouts to hold magnets of different orientations.
Figure 7:
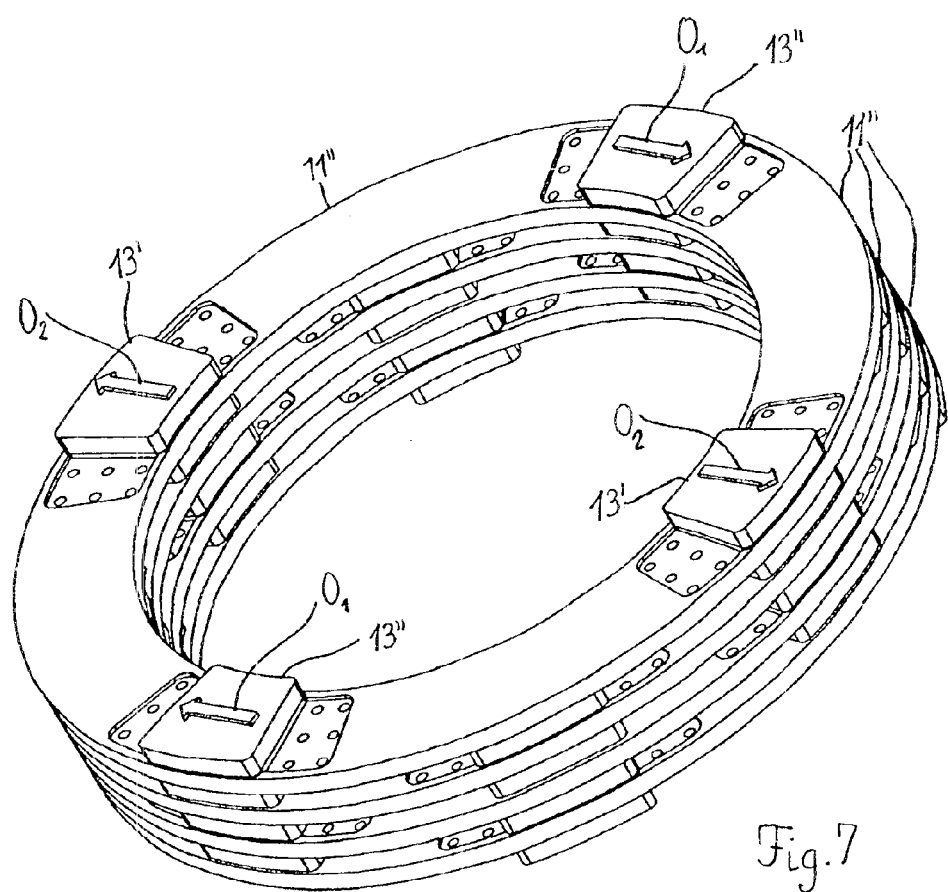
FIG. 7 shows a linear assembly of rings formed from rings as shown in FIG. 6.
Figure 8:
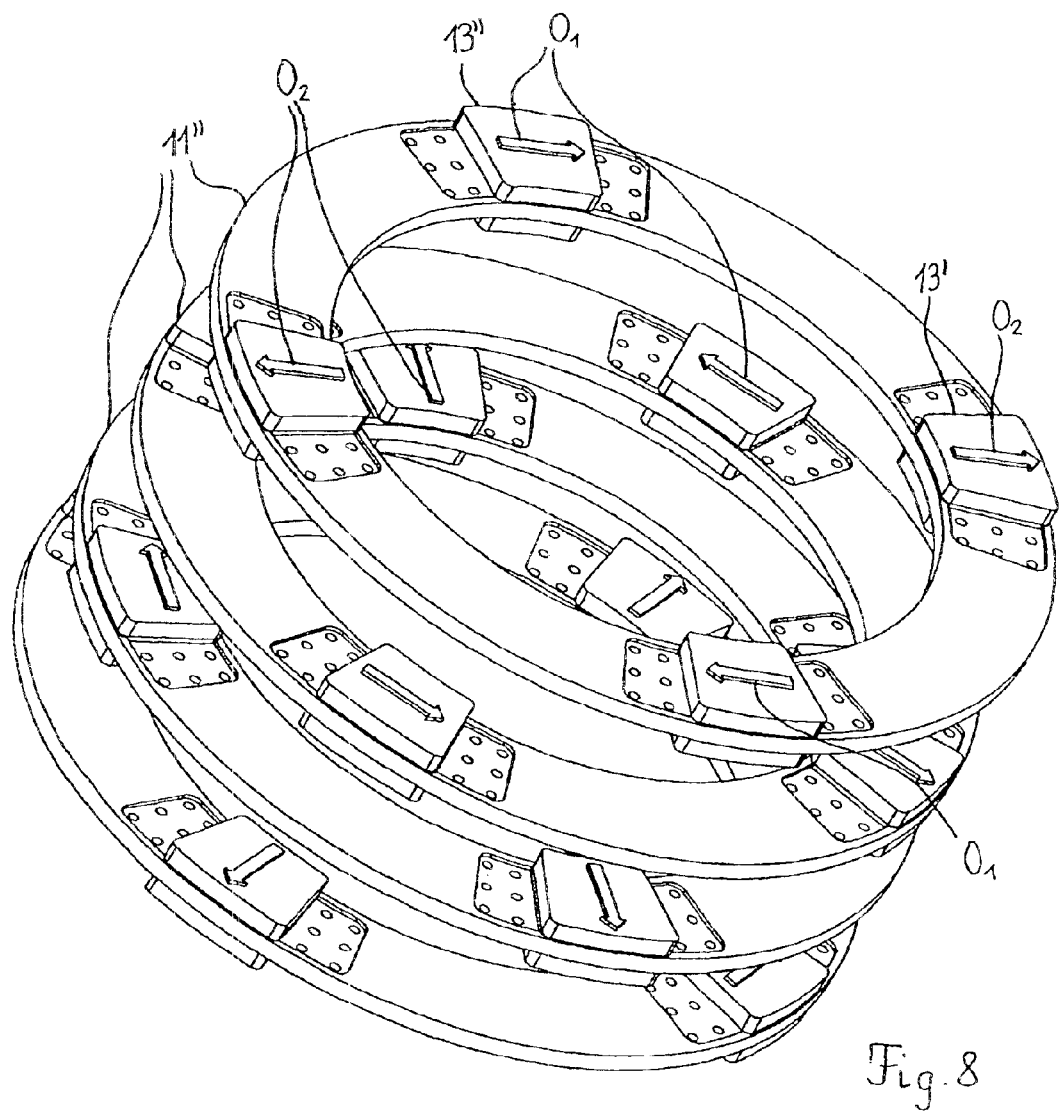
FIG. 8 is an opened-out view of the assembly shown in FIG. 7.
Figure 9:
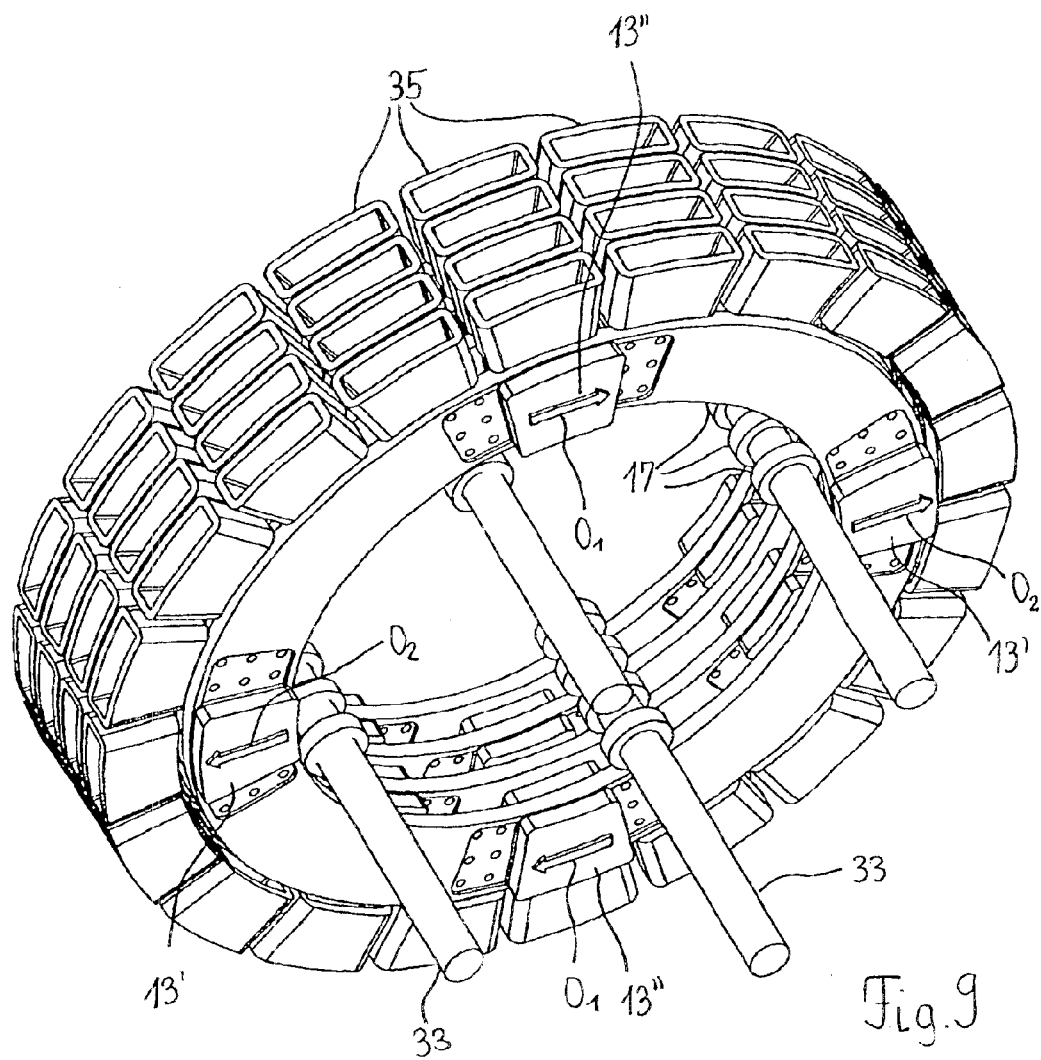
FIG. 9 shows a force-transmitting and generating device formed using rings as shown in FIG. 6.

The ring 11" shown in FIGS. 6 to 8, which has a total of four recesses 14b, can be used to allow force to be tapped off from the ring arrangement in operation by means of some of the magnets 13. For this purpose, two magnets 13" situated opposite one another are in a first orientation $O_1$ (in a tangential direction), by which means an impetus can be transmitted to the next adjoining ring virtually in its entirety, and the other two magnets 13', which are likewise situated opposite one another, are in a radial orientation $O_2$, by which means a maximum electrical field can be transmitted to a coil former 35 adjacent to ring 11 (FIG. 9). It goes without saying that only two magnets can be used rather than four, with the first magnet being polarised in the radial direction and the second in the circumferential direction.

The embodiment in FIG. 9 shows the bearings 17 arranged against the inner circumferences of the rings by means of the shafts 33 of the rings. Positioned at a distance from the rings 11 carrying the magnets 13' and 13" and in the same plane as them are a plurality of fixed coil formers 35 with or without ferrite cores (for the sake of clarity the ferrite cores and freewheeling bearings have not been shown in the drawing). The device for transmitting and tapping off force is only shown schematically and in operation, when the rings 11 rotate, the magnets 13' generate an electrical field in the coil formers 35 by induction and this field can be tapped off as electrical energy.

Figure 10:
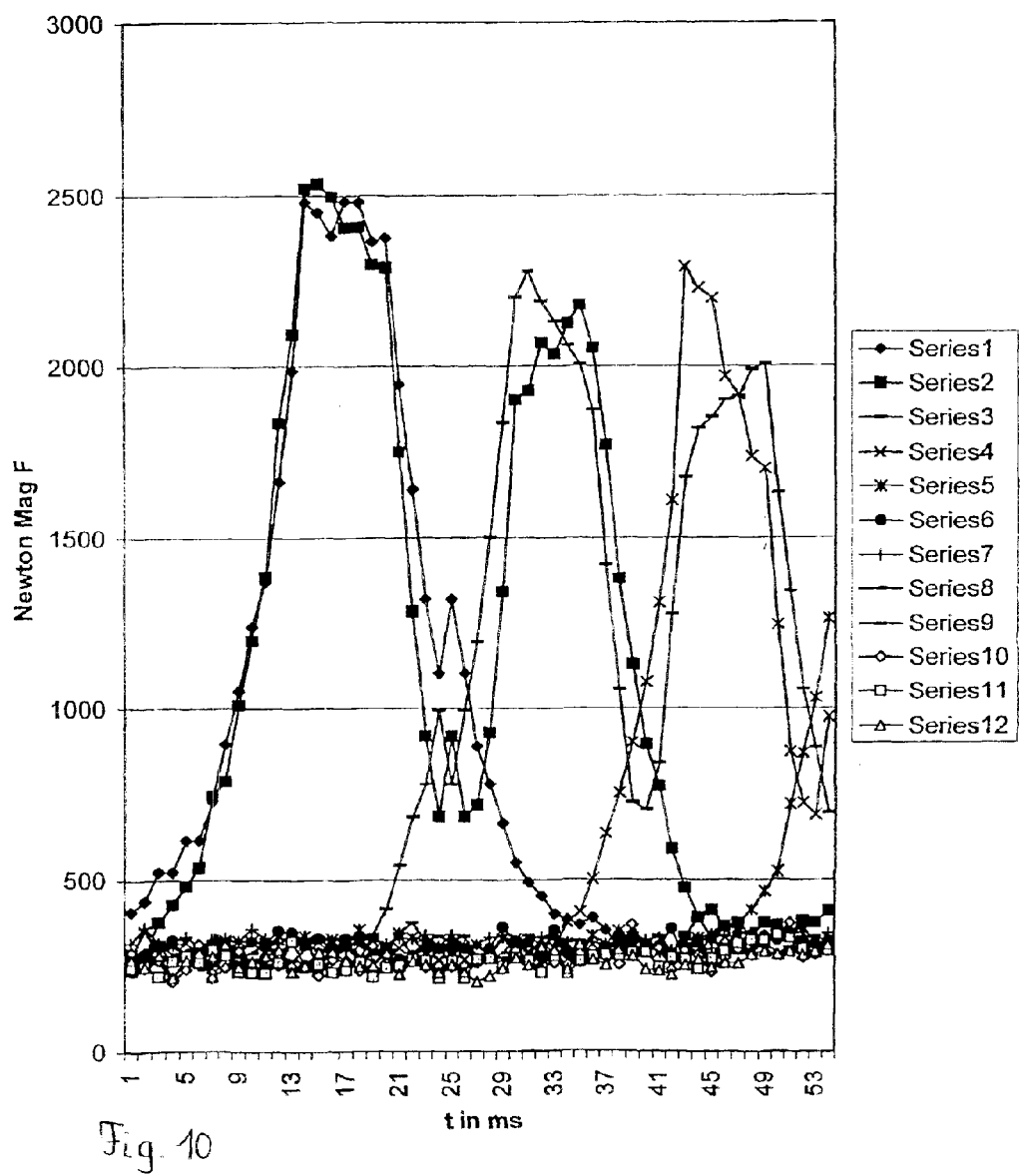
FIG. 10 shows the results of a dynamic electromagnetic field simulation.

FIG. 10 shows the results of a dynamic electromagnetic field simulation. Along the y axis is plotted the force in newtons which acts between the magnets 13 in two adjacent rings and the x axis is the time axis in ms. The plot shows that the relative forces are virtually balanced after only the first pass (=transfer of impetus) and the energy (integrated curves) is maintained between the individual passes.

Figure 11:
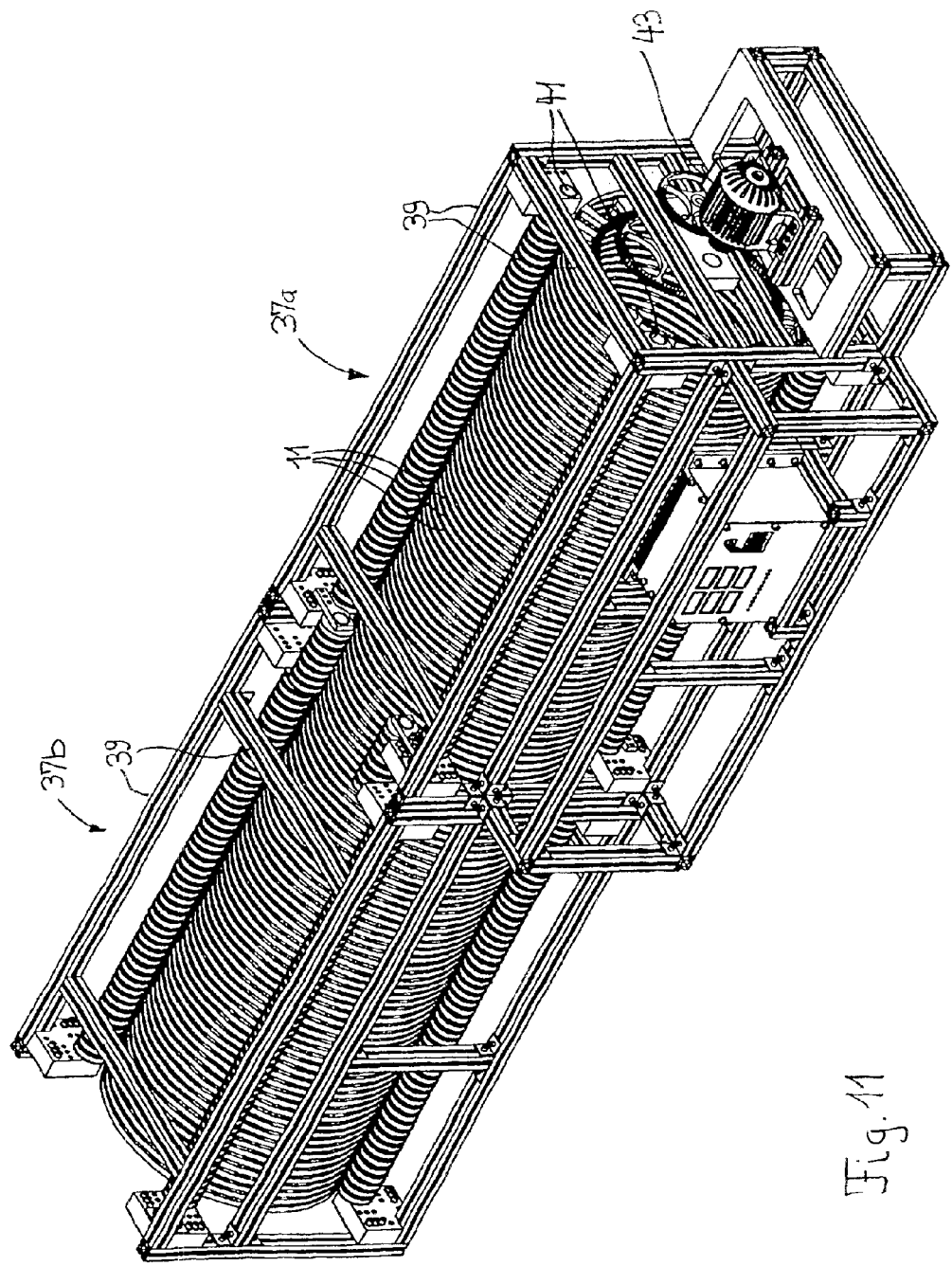
FIG. 11 is a schematic view of a prototype device for transmitting force and tapping force off at the same-time having a large number of rings positioned one behind the other.

The device for transmitting force and enabling energy to be tapped off at the same time which is shown in FIG. 11 comprises two modules 37a, 37b joined together in line with one another, each having a plurality of rings 11 arranged one behind the other. The rings 11 are mounted to be freely rotatable by means of bearings 17 which rest against the circumferences of the rings, with freewheeling bearings (not shown in FIG. 11 for representational reasons) ensuring that the rings 11 can rotate in only one specific direction of rotation. Also shown are coil formers 35 arranged around the rings 11 by means of which energy can be tapped off.

The modules 37a, 37b have a frame 39 in which are arranged shafts 41 extending in the longitudinal direction for the bearings 17. Shown at the end of the device is an electric motor 43 which acts as an impetus generator. The electric motor can be used to transmit a starting impetus to the front ring. By virtue of the technical features already described of the force transmitting device, this impetus is then transmitted to the other rings and can be fed back from the last ring in the device to the first one. It goes without saying that in the case of an arrangement like that shown having a very large number of rings positioned one behind the other more than one impetus can be fed in and can be on its way along the arrangement.

On reading what is said above, it will be clear to the person skilled in the art that with an annular layout for the devices for transmitting force and allowing it to be tapped off which are shown as examples, once impetuses have been fed in, and providing the frictional resistance encountered is only slight, impetuses can be maintained in the system for a very long time. However, since at the same time electrical fields can be generated in coil formers by induction when the rings, discs etc. rotate or suitably designed carriages move in translation, it is possible for energy to be tapped off or obtained in this way when the force-transmitting device is operating.

Figure 12:
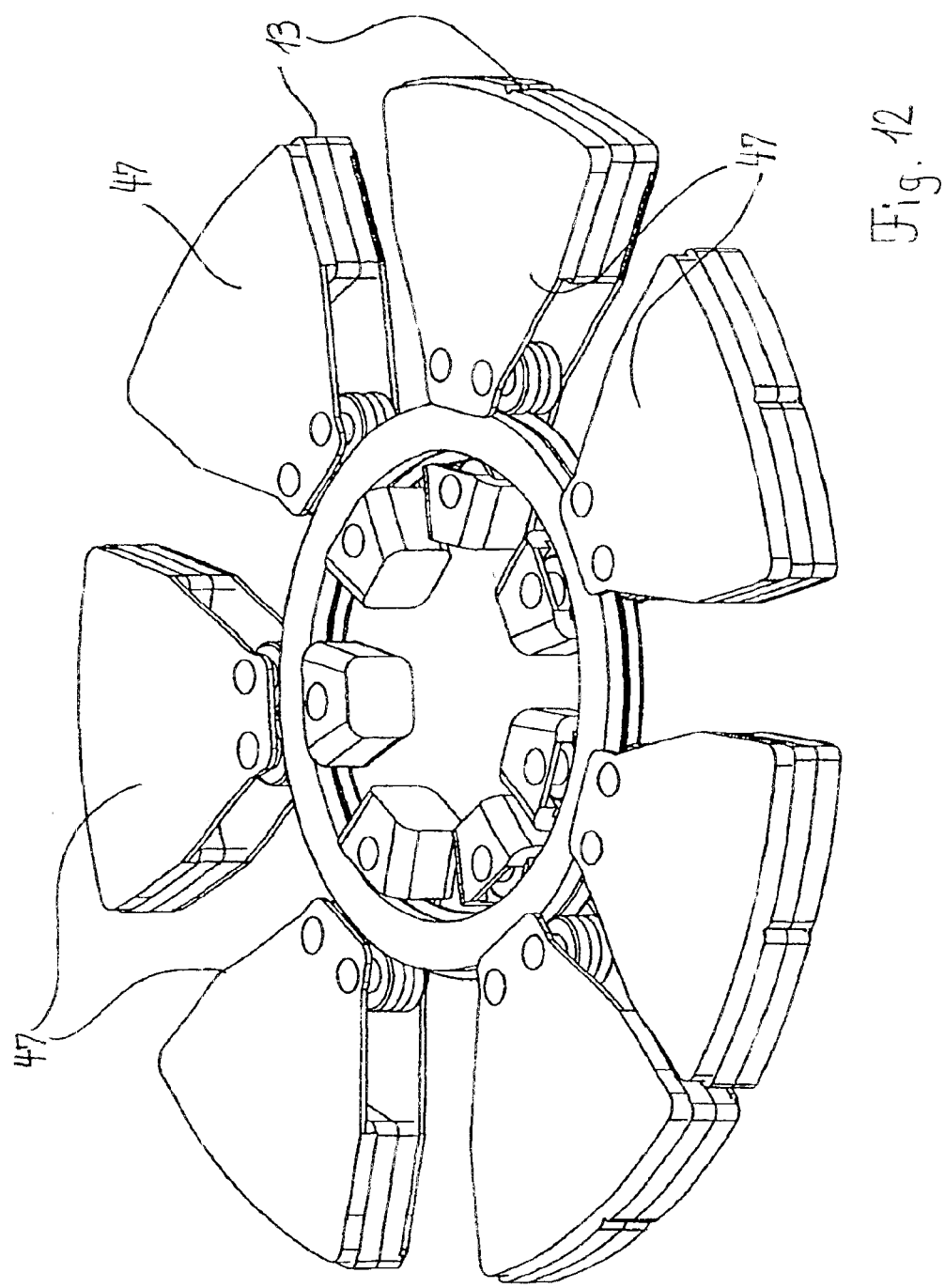
FIG. 12 shows a further embodiment of support in the form of a ring which has magnets projecting in the radial direction.
Figure 13:
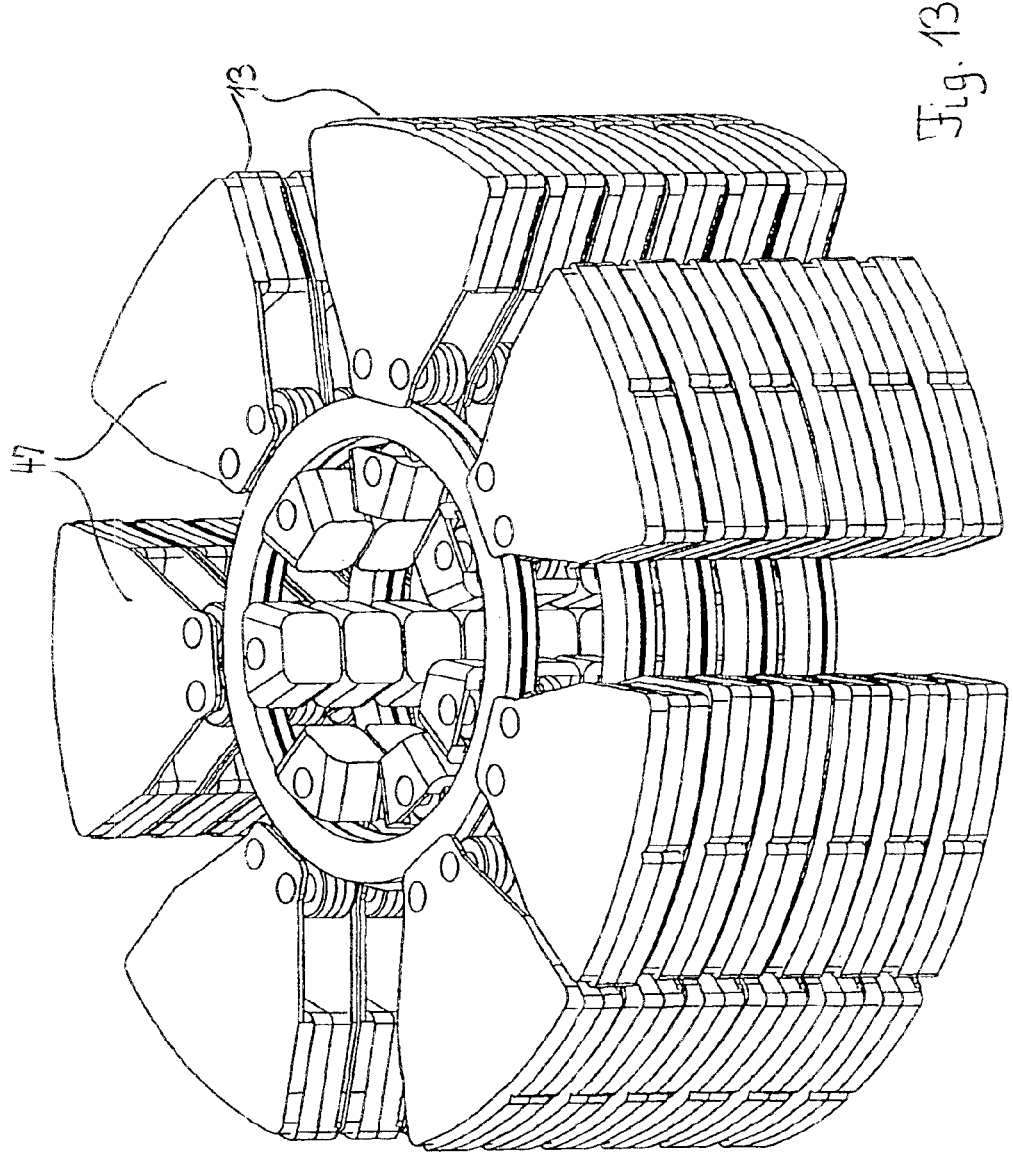
FIG. 13 shows an assembly of rings as shown in FIG. 12 positioned in a spaced relationship one above the other.
Figure 14:
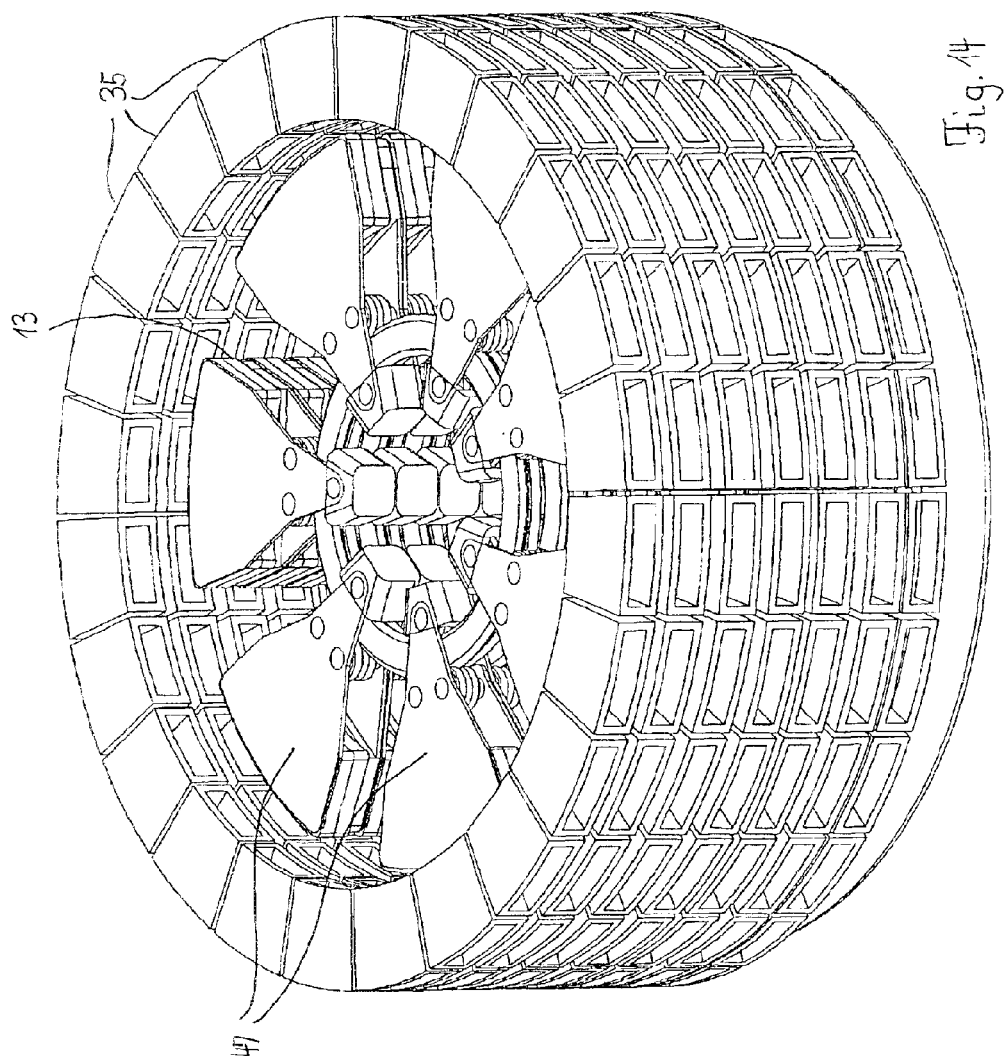
FIG. 14 shows a ring assembly as shown in FIG. 13 having a stack of coils laid out around the rings.

The device shown in FIGS. 12 to 14 differs from the embodiments shown previously in that the supports holding the magnets 13 are in the form of carriages 47. The carriages 47 are mounted so as to be free to move by means of bearings 51 which engage with the opposite side of ring 49. Freewheeling bearings not shown in the figures ensure that the carriages 47 can rotate along their circular path in only one specific direction. As in the other embodiments, so too in this one the magnets 13 are preferably assembled from a plurality of individual magnets in order to be able to obtain a magnetic field of greater strength.

Figure 15:
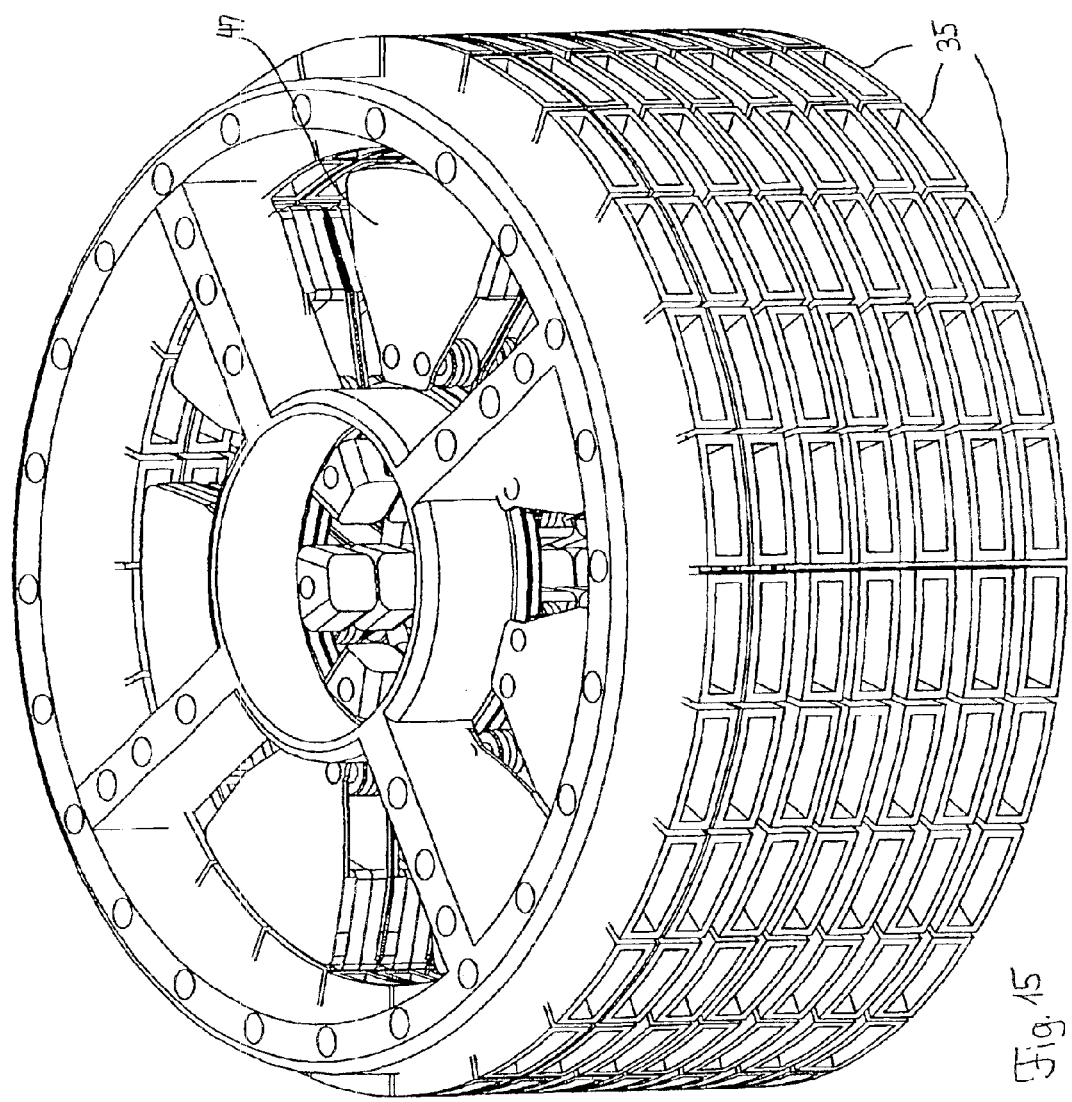
FIG. 15 shows the assembly shown in FIG. 14 with a frame at the end to carry the rings and the stack of coils.

FIGS. 14 and 15 are schematic views of the entire device for transmitting force and allowing it to be tapped off in which the individual rings 49 and the carriages 47 arranged against them are surrounded by a large number of coil formers 35 which are each positioned in the same planes as their respective rings. When the device is operating, the rotating magnets 13 generate in the coil formers 35 electrical fields which, when integrated over time, give the energy produced. The rings 49 and the coils 35 positioned around them are held together by flanges 53 mounted at the end faces.

Figure 16:
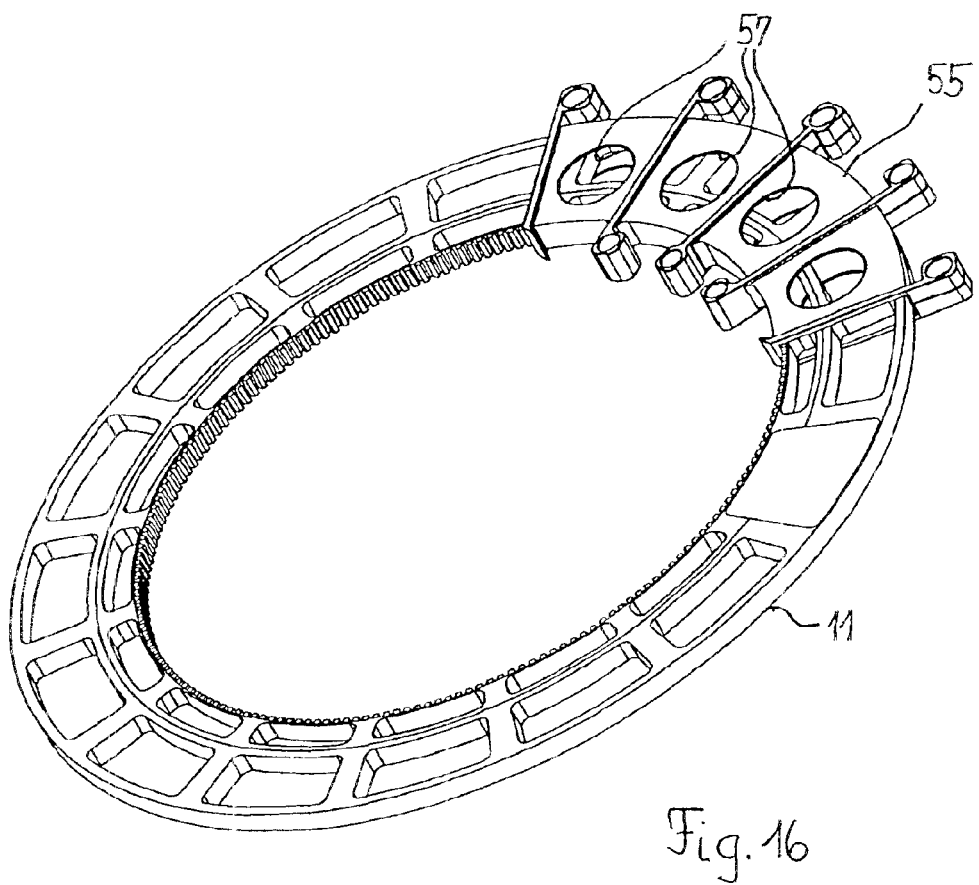
FIG. 16 is a schematic view of another possible embodiment for tapping off energy having a support in the form of a ring, where the coils can be arranged around the ring and perpendicularly to it.

The embodiment shown in FIG. 16 differs from the embodiments described previously in that the coils are not arranged at a distance from the periphery of the rings but at a distance from the plane of the ring perpendicularly. A mounting 55, of which only part is shown and which extends around the ring and has cutouts 57, is used to hold coils which are not shown in detail. In this embodiment, magnets whose field strength is at a maximum in a direction perpendicular to the plane of the ring need to be used.

Figure 17:
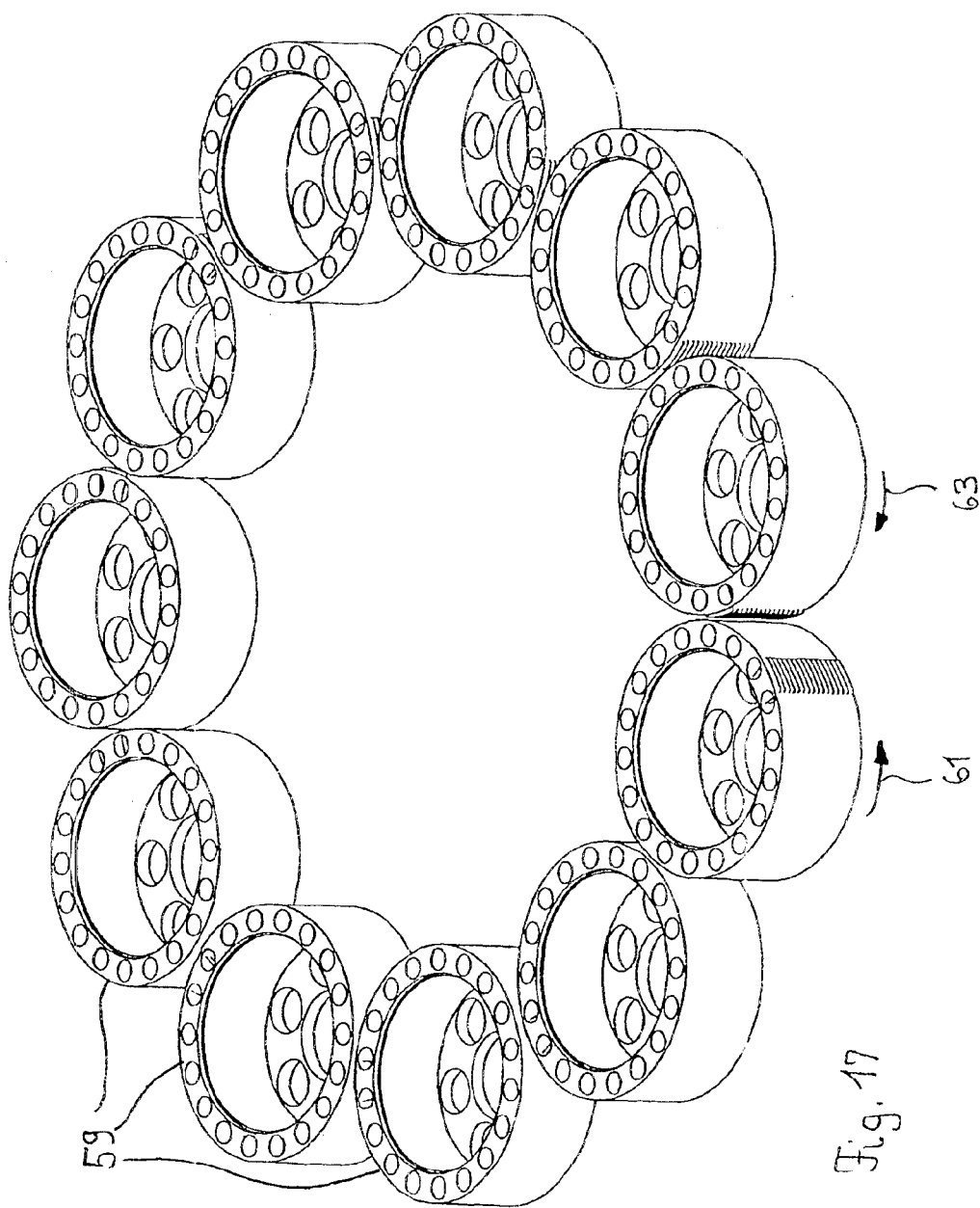
FIG. 17 is a schematic view of a device for transmitting impetus and tapping off energy having stacks of discs arranged in a circle.

FIG. 17 shows in diagrammatic form another basic arrangement for rings arranged in stacks 59. The ring stacks 59 are arranged in a circle but for the sake of clarity the coils, which are positioned around the stacks of rings inside and outside them, are not shown. Rings stacks which are adjacent to one another can turn in opposite directions (arrows 61 and 63).

To sum up, it can be said that the device according to the invention and the method can be used for transmitting force by means of magnetic interaction and at the same time for allowing energy to be tapped off. What is essential in this case is that, by means of magnets and magnetic repulsion, an impetus or torque is transmitted by a support which is fitted with magnets and mounted to move in a specific direction to the adjacent support, which is mounted to move in the same direction. It is important for each support to be connected to suitable means, e.g. freewheel means or freewheeling bearings, so that it can only turn or move forwards in one specific direction. The fact that the freewheel means employed make it impossible for a support which has been set in motion to go into reverse causes virtually the whole of the impetus to be transmitted to whichever support is next and so a starting impetus, having once been transmitted to the device for magnetic force transmission from an external source of impetus, can be transmitted for long distances with virtually no losses in a similar way to a wave. By using coils positioned at a distance from the path along which the magnets move, energy can be tapped off from the support arrangement at the same time when it is operating.

To the reader skilled in the art it will be clear that an enormous variety of different arrangements and designs are conceivable and producible within the scope of the invention without departing from the invention's basic concept.

Figure 18:
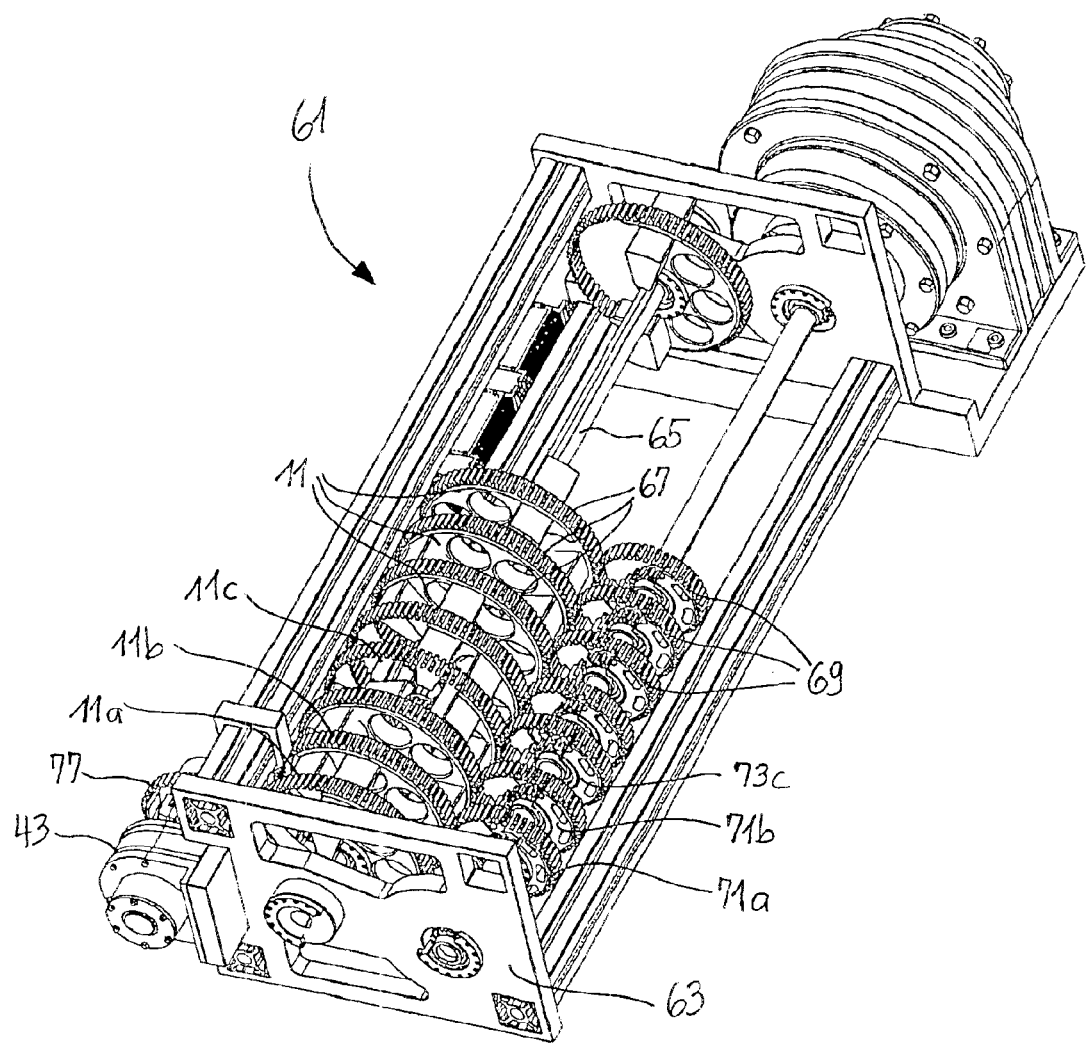
FIG. 18 schematically, a device for transmitting impetus and simultaneously driving a shaft.
Figure 19:
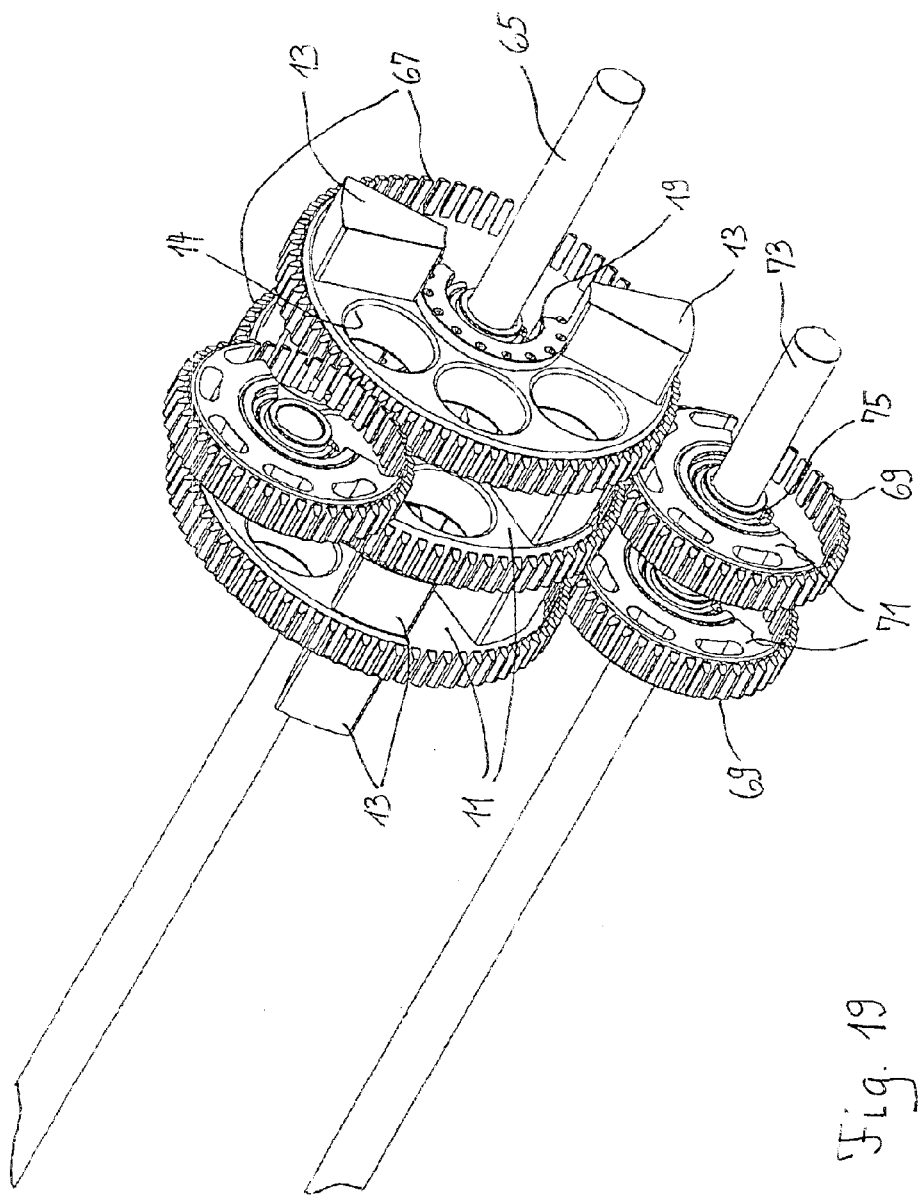
FIG. 19 is a schematic partial perspective view of the device of FIG. 18 showing the ring-shaped supports having teeth in their circumference which mesh with gears mounted on a shaft (part of the supports and gears, respectively, being cut off for a better illustration)
Figure 20:
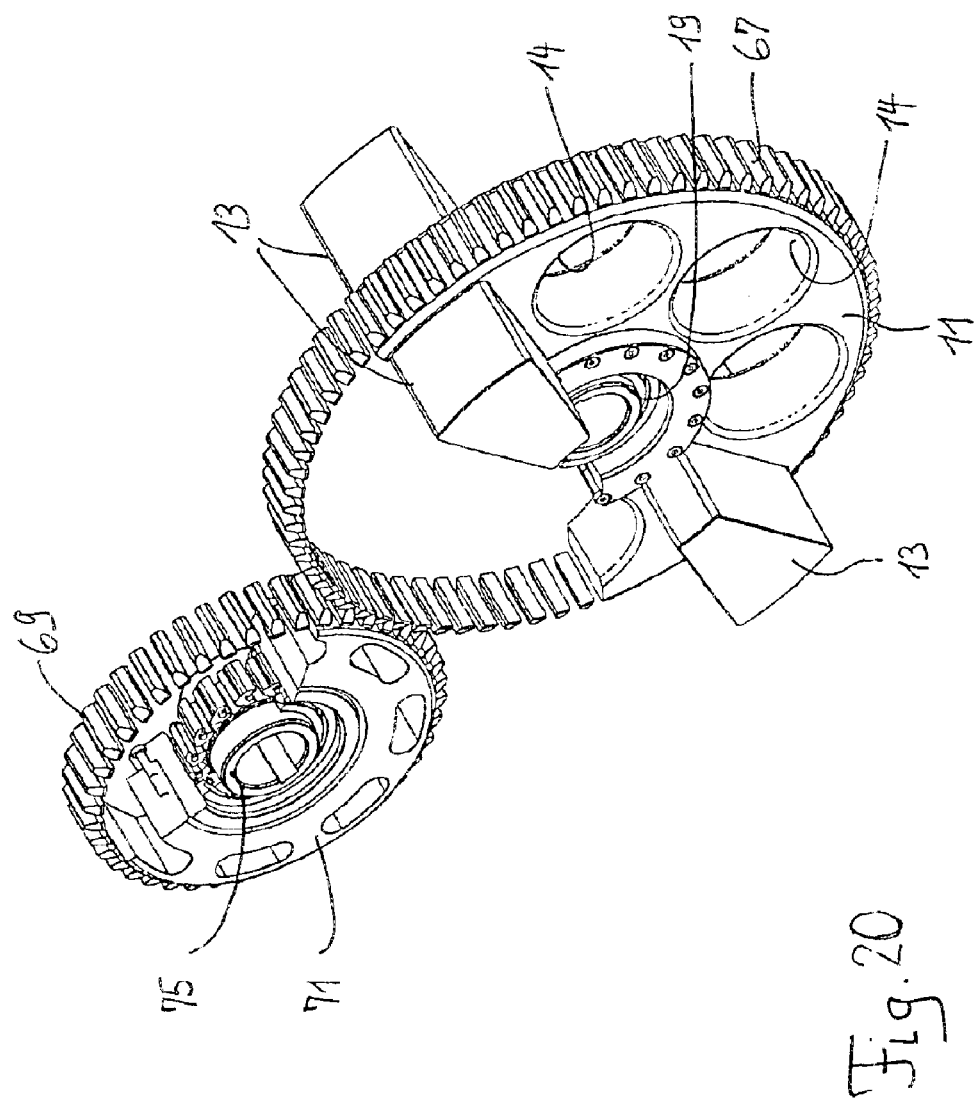
FIG. 20 shows a single support meshing with a gear (part of the support and the gear being cut off for a better illustration).

FIGS. 18 to 20 show a device 61 for tansmitting impetus and driving simultaneously a shaft. The device 61 comprises a frame 63 supporting a stationary axis 65 onto which supports or members 11 are mounted by means of backflush or back-stop bearings 19. Each support 11 is equipped with a plurality of magnets 13 (only two of them shown in FIGS. 19 and 20). Further, each support 11 is provided with teeth 67 in its circumference. Said teeth 67 mesh with teeth 69 of adjacent gears 71. Said gears 71 are mounted on a shaft 73 which is rotatably supported by the frame 63. The gears 71 are mounted onto the shaft 73 by separate backflush or back-stop bearings 75. Said backflush or back-stop bearings 75 ensure rotation of the shaft 73 only in direction. An electric motor 43 is mounted to the frame 63. It has a driving gear 77 mounted on a shaft (not shown in FIG. 18) which meshes with the teeth 67 of the first support 11*a*. The electric motor 43 serves for transmitting single impetus to the impetus transmitting device 61.

It is to be understood that the backflush or back-stop bearings 19 can be replaced by or, preferably be in combination with clutches. The clutches can be operated electrically, or electro-magnetically or mechanically. They ensure that the respective magnets of a driven (moving or rotating) support can approach to a maximum the magnets of the subsequent support thereby allowing a maximum impetus transmission from one to the next support.

The device 61 is operated in the following manner: At the beginning the electric motor 43 transmits an impetus to the first support 13 so that the first support 13 is rotated until the driving force equals the repulsive effect of the interacting magnets 13. The backflush or back-stop bearings 19 thereby prevent the first support from moving in reverse. The repulsive forces between the interacting magnets of the first and second supports 11*a*, 11*b* set the second support 11*b* in motion (the first support 11*a* held in position by the backflush or back-stop bearings 19). If clutches are used in combination with the back-stop means, the second (subsequent) support can also be held in position until the maximum repulsive force is reached. When the maximum repulsive force is reached, the clutch is released and the second support 11*b* rotates forwards until the repulsive forces between the magnets 13 of the second and third supports 11*b*,11*c* are equal in size, and so on.

When the support 11*a* rotates, also the gear 71*a* is rotated thereby rotating also the shaft 73. The remaining gears 71*b*,71*c* etc. do not rotate as the backflush or back-stop bearings 75 allow slipping of the shaft 73. This means that only the respective gear 71 being driven (rotated) by one of the supports 11 is set in motion. As the impetus moves forward from one support to the next, the shaft 73 is further rotated. This finally results in a continuous rotation of shaft 73. The rotational force can be used for driving another device.

It is to be noted that the electric motor can be operated continuously with an essentially constant rotational speed. Thus, the first support rotates also with a constant rotational speed. The subsequent (second) support, however, is held in position by a clutch and released when a predetermined repulsive force between the magnets of the first and second supports is reached. Thereafter the second support is released and the impetus transmitted to the third support. The third and the remaining supports thereby can also be in connection with clutches so that the impetus is transmitted to the adjacent support. The frictional forces between the mechanical components, e.g. bearings and axis, do not decrease the torque of the moving supports, but lead only to an increase of the time necessary until the impetus reaches the last support in a series of supports.

In the above-discussed embodiments the magnets can be permanently magnetized or electromagnets. Further, the magnets can be replaced by springs or pneumatic devices like gas springs or the like. It is to be understood that the impetus transmission may be realized by a combination of magnets and other mechanical means as proposed above.

| Captions | |
|---|---|
| 10a, 10b etc. | Embodiments of the magnetic force transmitting device |
| 11a, 11b, 11c ... | supports or members (rings) in the first embodiment |
| 13 | Magnet |
| 14a, 14b | Recesses in the rings 11a, 11b etc. and 11', 11" respectively to hold magnets and magnet stacks |
| 15 | Axis of rotation of rings |
| 17 | Rotary bearings |
| 19 | Freewheeling bearings |
| 20 | Direction of rotation of rings |
| 21 | Shaft |
| 23 | Gear |
| 25 | Teeth of gear 23 |
| 27 | Teeth on the interior |
| 29 | Cups for stacks of magnets |
| 31 | Rivets |
| 32 | Arrow = direction of polarisation |
| 33 | Shaft for rotary bearings |
| 35 | Coil formers |
| 37a, 37b | Modules of the device for transmitting force and allowing it to be tapped off in FIG. 11 |
| 39 | Frame of the device in FIG. 11 |
| 41 | Shafts for bearings 17 |
| 43 | Electric motor |
| 47 | Carriages |
| 49 | Ring of the embodiment shown in FIGS. 12 to 15 |
| 51 | Bearing |
| 53 | End flange of the embodiment shown in FIGS. 12 to 15 |
| 55 | Mounting to take coils |
| 57 | Recesses to take coils |
| 59 | Stack of rings |
| 61 | device for tansmitting impetus and simultaneously a shaft |
| 63 | frame |
| 65 | stationary axis |
| 67 | teeth provided in the circumference of the supports |
| 69 | teeth of gears 71 |
| 71 | gears for driving the shaft 73 |
| 73 | shaft driven by gears 71 |
| 75 | backflush or back-stop bearings connecting gears 71 to shaft 73 |
| 77 | driving gear of electric motor 42 of device 61 |

What is claimed is:

1. Method of transmitting force, in particular an impetus, magnetically by means of movable magnets which interact with one another, said method comprising:

providing a plurality of supports to hold or position one or more magnets projecting from the supports;

arranging each support such that it is movable on or by means of bearing means;

connecting each support to one or more freewheel means so that the support is rotatable or movable, about an axis of rotation or along a straight or curved path in translation respectively, in only one direction, in which case the support may be part of the bearing and/or freewheel means, fitting each support with one or more individual magnets in a preset arrangement, and positioning a plurality of said supports relative to one another at a distance so that an impetus transmitted to a first support is transmitted by this first support to an adjacent second support by magnetic interaction, is transmitted by said second support to a third support adjacent said second support, and so on, in which case the freewheel means makes it impossible for a support which has been set in motion to go into reverse and this causes virtually the whole of the impetus to be transmitted to whichever is the next support at the time; and arranging the impetus transmitting magnets such that the vector of polarization extends in the moving direction, and further arranging like poles of the magnets belonging to adjacent supports such that they are directed towards one another.

2. Method according to claim 1, characterised in that the support provided is a carriage and a plurality of carriages are arranged one behind the other at a distance from each other on a rail which follows a straight or curved or circular etc. path so that a starting impetus transmitted from an external impetus source to the first carriage is transmitted through to the last carriage situated on the rail.

3. Method according to claim 1, characterised in that the support provided is a disc and a plurality of discs are arranged at a distance from one another on a common axis of rotation to form a stack, so that a starting impetus transmitted from an external impetus source to the first disc in the stack is transmitted through to the last disc in the stack.

4. Method according to claim 3, characterised in that the common axis of rotation of the stack of discs follows a straight or curved path and preferably a circular path.

5. Method according to claim 1, characterised in that the magnets which adjacent supports have and which are used to transmit impetus are so orientated that when they approach one another the result is preferably the maximum repulsion.

6. Method according to claim 1, characterised in that coils are arranged at a distance from the path of movement of the magnets so that the movement of the magnets generates an electrical field in the coils by induction and an electrical current can be tapped off.

7. Method according to claim 1, characterised in that each support is fitted with at least two magnets spaced apart from one another and the magnets are so orientated that the magnets in a specific first orientation are used to transmit the impetus to whichever is the adjacent support and the magnets in a specific second orientation are used to allow the force to be tapped off.

8. Method according to claim 1, characterised in that in a non-closed-loop arrangement, where the supports are arranged in a line, the impetus from the last support is passed back or fed back again to the first support.

9. Device for transmitting force, in particular an impetus by means of magnetic interaction, comprising:

a plurality of supports each fitted with one or more magnets, with each support being positioned on bearing means and one or more freewheel means, in particular freewheeling bearings, being connected to the individual supports so that the supports carrying the magnets are able to move in only one moving direction either about an axis of rotation or along a straight or curved axis of translatory movement, and an arrangement of the supports relative to one another such that an impetus transmitted to a first support is transmitted by magnetic interaction from this first support to the adjacent second support, from this second support to the third support adjacent to the second support and so on, in which case the reversal of direction of a support once set in motion, which is made impossible by the freewheeling bearing or bearings, causes the impetus to be transmitted virtually in full to whichever support is next and a starting impetus, having once been transmitted to the magnetic force-transmitting device from an external impetus source, can be transmitted for long distances with virtually no losses in a similar way to a wave, wherein the impetus transmitting magnets are arranged such that the vector of polarization extends in the moving direction, and further in that like poles of the magnets belonging to adjacent supports are directed towards one another.

10. Device according to claim 9, characterised in that the support provided is a carriage and a plurality of carriages are arranged to be spaced apart from one another on a rail which follows a straight or curved or circular etc. path, so that a starting impetus transmitted from an external impetus source to the first carriage will be transmitted through to the last carriage on the rail or will travel round in a circle.

11. Device according to claim 9, characterised in that the support provided is a disc and a plurality of discs are positioned at a distance from one another on a common axis of rotation to form a stack, so that a starting impetus transmitted from an external impetus source to the first disc in the stack will be transmitted through to the last disc in the stack.

12. Device according to claim 10, characterised in that each disc has a central freewheeling bearing which holds the disc and causes it to be mounted to rotate in only one direction of rotation.

13. Device according to claim 9, characterised in that the support provided is a ring and a plurality of rings are positioned at a distance from one another on a common axis of rotation to form a stack, so that a starting impetus transmitted from an external impetus source to the first ring in the stack will be transmitted to the last ring in the stack.

14. Device according to claim 12, characterised in that the rings are mounted so as to be free to rotate by means of a plurality of bearings resting against their peripheries and in that teeth are provided on the inside of the rings with which a gear held by a freewheeling bearing meshes.

15. Device according to claim 9, characterised in that the common axis of rotation of the stack of discs or rings is a straight or curved path and preferably a circular path.

16. Device according to claim 9, characterised in that the support provided for the magnets is a disc and a plurality of discs are arranged at a distance from one another in a common axis of plane so as to be rotatable in only one direction by means of one or more suitable bearings, so that a rotary starting impetus transmitted from an external impetus source to the first disc will be transmitted through to the last disc in the arrangement of discs.

17. Device according to claim 9, characterised in that the orientation of the magnets positioned on adjacent supports is such that a repulsion which is preferably the maximum is produced when they approach each other.

18. Device according to claim 9, characterised in that coils are arranged at a distance from the path along which the magnets move so that moving the magnets enables an electrical field to be generated in the coils by induction and an electrical current to be tapped off.

19. Device according to claim 18, characterised in that each support is fitted with at least two magnets of different orientations which are spaced apart from one another, with the magnets in a specific first orientation being used to transmit the impetus to the adjacent support and the magnets in a specific second orientation being used to allow the force to be tapped off, in which case the magnets for impetus transmission may be situated either parallel to or radially inwards or outwards of the magnets for transmission by induction.

20. Device according to claim 9, characterised in that where the supports are not in a closed-loop arrangement, means are provided for transmitting or feeding the impetus from the last support back to the first support.

21. Device according to claim 8, characterised in that the bearing means are ball bearings, freewheeling bearings, plain bearings, air bearings or a combination of freewheeling and ball bearings or the like.

22. Device for transmitting force by magnetic interaction and for allowing energy to be obtained or tapped off according to the characterising features of claim 9.

23. Device according to claim 9, characterised in that the supports are mechanically coupled to an external device which is driven by the arranged at a distance from the path along which the magnets move so that moving the magnets enables an electrical field to be generated in the coils by induction and an electrical current to be tapped off.

24. Use of a device according to claim 9 in conjunction with coils arranged at a distance from the path of movement of specific magnets to allow force to be tapped off and energy to be obtained.

25. Method according to claim 1, characterised in that the supports when in motion are driving at least an external device or arrangement.

26. Method according to claim 1, wherein the magnets are replaced by springs or pneumatic devices like gas springs.

27. Device according to claim 9 wherein the magnets are replaced by springs or pneumatic devices like gas springs.

28. Device according to claim 9 wherein the impetus transmission is realized by a combination of magnets and springs or pneumatic devices like gas springs.

* * * * *